United States Patent
Orbach et al.

[11] Patent Number: 5,748,071
[45] Date of Patent: May 5, 1998

[54] HIGH SPEED COMPARATOR WITH PROGRAMMABLE REFERENCE

[75] Inventors: Yair Orbach, Lev-Hashomron; Eitan Zmora, Jerusalem; Dror Halahmi, Tel Aviv, all of Israel

[73] Assignee: Motorola, Inc., Schaumburg, Ill.

[21] Appl. No.: 746,512

[22] Filed: Nov. 12, 1996

[51] Int. Cl.$^6$ .................................................. G06F 7/02
[52] U.S. Cl. ................................................. 340/146.2
[58] Field of Search ........................................ 340/146.2

[56] References Cited

U.S. PATENT DOCUMENTS

| | | | |
|---|---|---|---|
| 4,857,882 | 8/1989 | Wagner et al. | 340/146.2 |
| 5,581,228 | 12/1996 | Cadieux et al. | 340/146.2 |
| 5,586,288 | 12/1996 | Dahlberg | 340/146.2 |

Primary Examiner—Margaret Rose Wambach
Attorney, Agent, or Firm—Robert M. Handy

[57] ABSTRACT

A system rapidly dynamic values (B) on a bus (12) to a programmable but thereafter fixed reference value (C). The system includes first leads (33) coupled to a comparison means (35), second leads (13) coupled to the bus (12) and third leads (34, 36) coupled to sources of potential (GND, VCC) related to logical HIGH and LOW of the fixed reference value (C). The leads (33, 13, 34, 36) are coupled in one or more programmable connection cell (32). Connections (471) or disconnections (461) are made between the leads (33, 13, 34, 36) so that the dynamic values (B) and the appropriate logical HIGH and logical LOW values are presented to the correct inputs of the comparison means (35). The programmable connections cells (32) invert the reference value (C) to ($\overline{C}$) for coupling to the comparator (35). The system replaces a level of conventional decode logic (16) by the programmable interconnections (47), thereby reducing delay time, using fewer devices and occupying less circuit area.

14 Claims, 4 Drawing Sheets

5,748,071

HIGH SPEED COMPARATOR WITH PROGRAMMABLE REFERENCE

FIELD OF THE INVENTION

The present invention relates to a means and method for comparing digital values, especially in connection with integrated circuits, modules and systems.

BACKGROUND OF THE INVENTION

It is frequently desired in the electronic art to compare various digital numbers to determine whether they are equal to or smaller or larger than a predetermined value. In some situations the dynamic or changing values are to be compared to a fixed, i.e., programmable but thereafter unchanging value, hereafter called the "reference" value. The dynamic values can be, for example, digital signals present on a bus or in a register and can represent addresses or data or commands or any other information. The reference value can be any kind of a value, for example, one which defines a border or threshold or a particular value of interest.

Many different comparator circuits are known in the art for performing such functions. A difficulty with prior art comparators is that significant time is required for making the comparison since generally several layers or levels of decoding logic are required for a bus or register of any significant width. This is a distinct disadvantage where rapid determination of, for example, a boundary condition is needed. Accordingly, there is a continuing need to have means and methods for performing comparisons of digital words or values that can be obtained more quickly than with prior art implementations. It is desirable to achieve this improvement using fewer devices and less circuit area.

DETAILED DESCRIPTION OF THE PREFERRED EMBODIMENT

The convention [N:0] is used herein to indicate the width (N+1) of a bus or the number of bits (N+1) in a digital word on the bus. For convenience of explanation and not intended to be limiting, the problem and solution are illustrated for the case of a 4-bit digital value, that is, N=3. However, those of skill in the art will understand based on the description herein that N can be larger or smaller. Also for convenience of explanation, it is assumed that the individual digits or bits are binary and have only two possible values (e.g., 0 or 1), but persons of skill in the art will likewise understand that more complex representations can also be used. The words "value", "digit" and "bit", singular or plural, are intended to include any value of N>1 and binary and other representations.

Figure 1:
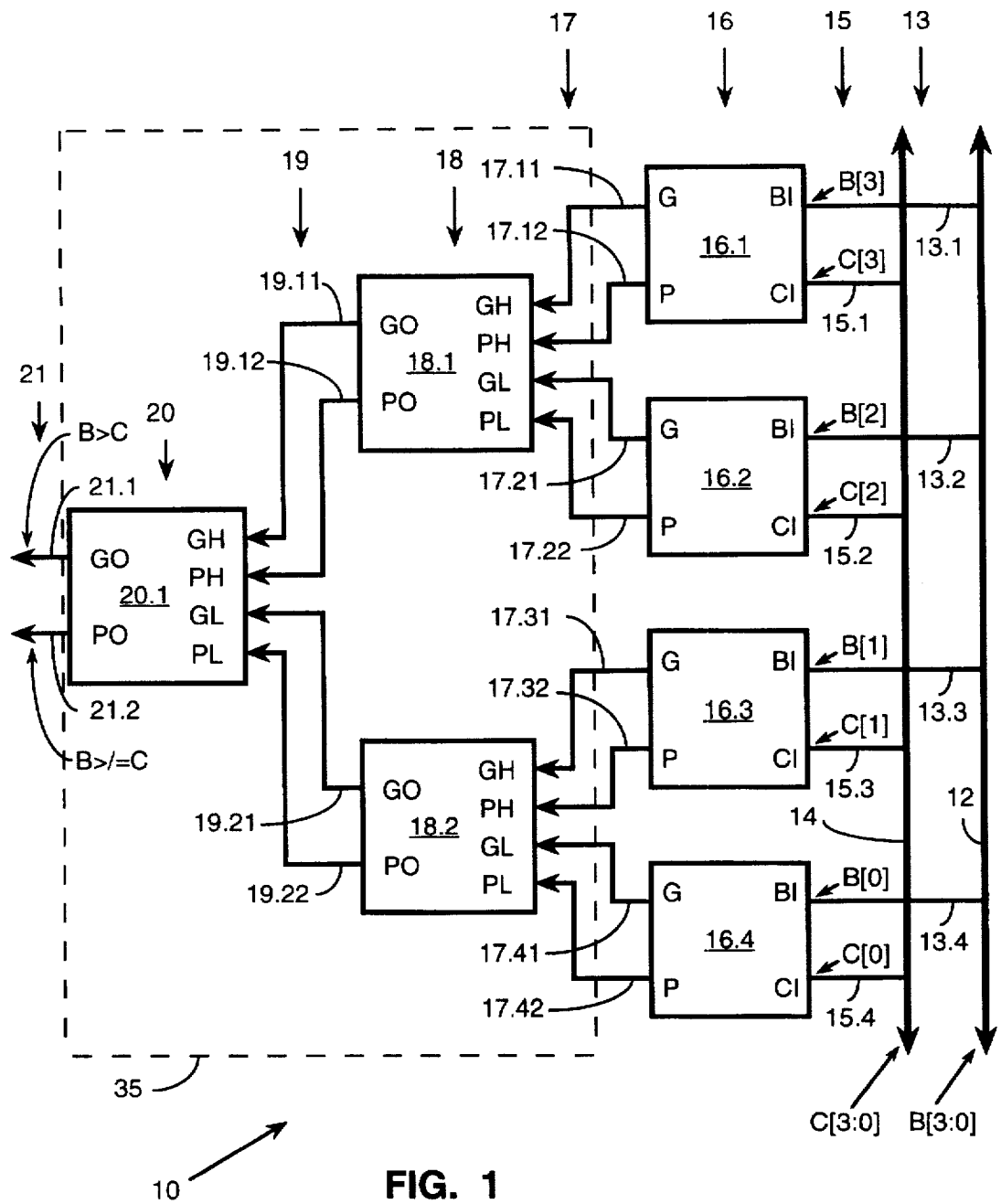
FIG. 1 is a simplified schematic block diagram of comparator, according to the prior art.

FIG. 1 is a simplified block diagram of prior art, 4-bit, decoder 10 for evaluating the equation:

$$A=(B>C)?1:0, \qquad (1)$$

where B is a dynamic (changing) digital value present on bus 12 and C is a reference value on bus 14, to which B is being compared. The parameter A takes on the logical values 1 or 0 as a result of performing the comparison, e.g., A=1 if (B>C) is true, A=0 if (B>C) is false. As used herein, the word "bus" is intended to refer to any source of digital numbers.

In decoder 10, bus 12 carrying dynamic digital value B[3:0] and bus 14 carrying reference digital value C[3:0] are coupled to logic circuits 16.1–16.4 of logic level 16 via connections 13, 15, e.g., 13.1–13.4 and 15.1–15.4. Logic level 16 is coupled via connections 17, e.g., 17.11–17.42, to logic circuits 18.1–18.2 of logic level 18. Logic circuits 18.1–18.2 are coupled to logic circuit 20.1 of logic level 20 via connections 19, e.g., 19.11–19.22.

Figure 2:
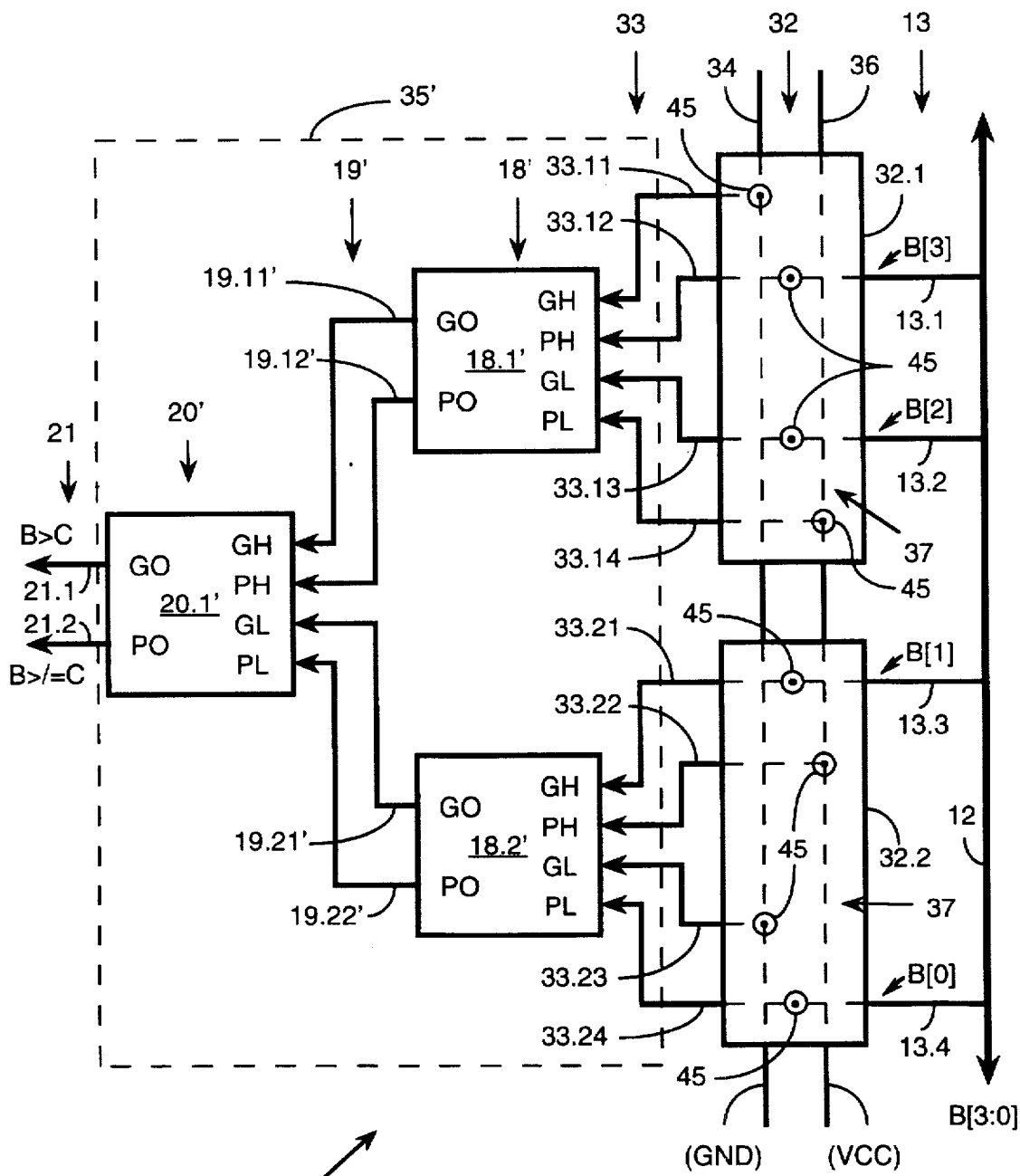
FIG. 2 is a simplified schematic block diagram of a comparator according to the present invention.

In the example of FIGS. 1–2, it is assumed for convenience of explanation and not intended to be limiting, that buses 12, 14 have four lines [3:0], each carrying one bit of 4-bit digital words B[3:0], C[3:0], respectively. For simplicity of explanation is it assumed that digital word C has the value 1001, i.e., C[3]=1, C[2]=0, C[1]=0 and C[0]=1. However, any other value could also be chosen. Since digital words B, C have only four bits, a three stage decoder comprising logic levels 16, 18, 20 is sufficient to evaluate Eq. (1). Logic level 16 comprises identical logic circuits 16.1, 16.2, 16.3, 16.4, each having two inputs BI, CI coupled respectively to lines of buses 12 and 14. Thus, bus line B[3] is coupled to input BI of circuit 16.1, bus line B[2] to input BI of circuit 16.2, bus line B[1] to input BI of circuit 16.3 and bus line B[0] to input BI of circuit 16.4. Similarly, bus line C[3] is coupled to input CI of circuit 16.1, bus line C[2] is coupled to input CI of circuit 16.2, bus line C[1] is coupled to input CI of circuit 16.3 and bus line C[0] is coupled to input CI of circuit 16.4. In the example given, C has the value 1001.

Identical logic circuits 16.1–16.4 each have outputs G, P where the results of evaluating logical expressions (2) and (3) appear, that is:

$$G=B\&\underline{C} \qquad (2)$$

$$P=B|\underline{C} \qquad (3)$$

where $\underline{C}$=C "bar," i.e., the value is inverted (if C=1001, then $\underline{C}$=0110). The symbol "&" indicates a logical "AND" operation and the symbol "|" indicates a logical "OR" operation. Identical circuits 18.1–18.2 each have four inputs GH, PH, GL, PL coupled, respectively, to the G, P outputs of logic circuits 16.1–16.2 and 16.3–16.4, as illustrated in FIG. 1. Circuits 18.1–18.2 each have outputs GO, PO which are coupled, respectively, to the GH, PH, GL, PL inputs of circuit 20. Logic circuits 18.1–18.2 and 20.1 are of the same type and evaluate the expressions:

$$GO=GH|PH\&GL \qquad (4)$$

$$PO=PH\&PL, \qquad (5)$$

where the suffixes "H" and "L" indicate HIGH and LOW, respectively.

For C[x]=0, G=B and P=1, and for C[x]=1, G=0 and P=B, where x has the values 3, 2, 1, 0 corresponding to the bus lines C[3:0]. Thus, assuming that C[3:0]=1001, circuits 16.1 and 16.4 have outputs G=0 and P=B, and circuits 16.2 and 16.3 have outputs G=B and P=1. The outputs of logic level 16 are combined in circuits 18.1–18.2 according to equations (4), (5) and fed to identical circuit 20.1. From circuit 20.1, one obtains GO=1 for B>C, otherwise 0, and PO=1 for B>/=C, otherwise 0, where the symbol ">/=" indicates "greater than or equal to." Thus, the comparator truth table output from logic level 20 is, B<C for GO, PO=0, 0; B=C for GO, PO=0, 1; B>C for GO, PO=1, 0; and GO, PO=1, 0 is not possible.

Decoder 10 of FIG. 1 functions well but has the disadvantage that it requires more layers of logic and more active devices than are desirable. Each logic layer or device introduces delay in evaluating the comparison. When the comparison must be very fast, the propagation delays through the multiple logic levels and devices can be prohibitive. Thus, there is a great practical need to reduce the number of propagation delays involved in comparing B and C. It is further desirable to reduce the propagation delays in such a way that different values of C can be easily assigned and without a significant surface area or cost penalty in an integrated circuit, module or system. It is particularly advantageous if the integrated circuit area occupied by the comparator can be reduced.

FIG. 2 is a simplified schematic block diagram of comparator 30 according to the present invention. For convenience of explanation and not intended to be limiting, it is also assumed in connection with FIG. 2 that bus 12 has four lines B[3:0] each of which can carry value 1, 0, and that C has a constant value C=1001. Those of skill in the art will understand based on the description herein, that bus B[N:0] can have more or fewer lines than N=3 with corresponding values in the range [N:0] appropriate for the system application, and that reference value C[M:0] can generally have any range M</=N and any desired value in the range [M:0].

Comparator 30 takes advantage of the fact that reference value C is fixed for a particular application and therefore can be hard wired into the integrated circuit, module or assembly. A particularly simple and effective means is provided for setting the reference value, that is fully compatible with typical integrated (or modular) circuit fabrication processes and which permits C to have any desired programmed value.

Comparator circuit 30 has logic levels 18', 20' comprising circuits 18.1'–18.2' and 20.1', analogous to logic levels 18, 20 and circuits 18.1–18.2 and 20.1, of FIG. 1. Each of logic circuits 18.1'–18.2', 20.1' has four inputs GH, PH, GL, PL and two outputs GO, PO. Logic levels 18', 20' perform the same logical evaluation as logic levels 18, 20 of FIG. 1 and the truth tables and equations previously described also apply to the outputs of logic levels 18', 20'. Logic levels 18, 20 and their interconnections are collectively referred to as decoder 35. While a particular implementation is shown for decoder 35, any comparison means capable of executing the desired logic equations to provide the desired relative evaluation of values of B and C is suitable.

Interposed between bus 12 carrying dynamic values B and logic level 18 of decoder 35 are programmable connection cells 32, i.e., connection cell 32.1 for logic circuit 18.1' and connection cell 32.2 for logic cell 18.2'. Programmable connection cells 32.1–32.2 are coupled to bus 12 by connections 13.1–13.4 and to logic level 18 by connections 33, comprising connections 33.11–33.24. Bus 14 of FIG. 1 is not needed with comparator 30 since reference value C[M:0] is provided in a different manner within cells 32. The preferred construction of cells 32 is explained later in connection with FIGS. 3–5. Circles 45 in cells 32 in FIG. 2 indicate schematically how leads 13, 33, 34, 36 are connected to accomplish entry of reference value C. Leads 34, 36 are coupled, respectively, to logic LOW, for example, the logic level "0" or electrical reference or ground (GND), and logic HIGH, for example, logic level "1" or a power supply rail (e.g., VCC).

The following discussion is based on the example where C=1001, but those of skill in the art will understand based on the description provided herein, how to use any desired value of C[M:0].

For logic circuit 18.1', input GH is coupled to logic level 0 (e.g., ground, abbreviated "GND"), input PH is coupled to bus line B[3], input GL is coupled to bus line B[2] and input PL is coupled to logic level 1 (e.g., VCC). For logic circuit 18.2', input GH is coupled to bus line B[1], input PH is coupled to logic level 1, input GL is coupled to logic level 0 and input PL is coupled to bus line B[0]. With this arrangement, the inputs to circuits 18' in FIG. 2 are the same as the inputs to circuits 18 in FIG. 1 for the example described where B[3:0] was present on bus 12 and 1001 was present on bus 14. Logic levels 18, 20 and 18', 20' function in the same way in both FIGS. 1 and 2. The truth table executed by comparator 30 is identical to the truth table executed by comparator 20, but with logic layer 16 eliminated. This is of great practical utility since it substantially speeds up the comparison process and reduces the number of transistors and the circuit area required for the comparator.

Figure 3:
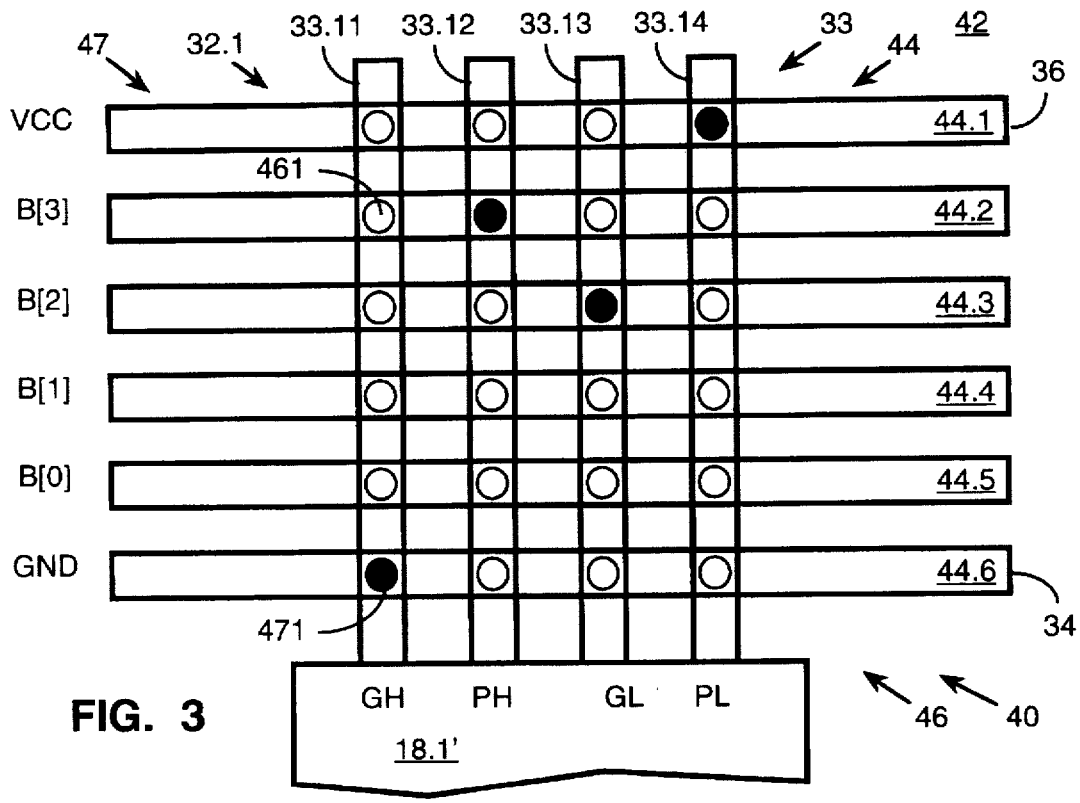
FIG. 3 is a simplified top view of a circuit layout illustrating how a fixed reference value is wired into the circuit of FIG. 2 using programmable connection cells, according to a first embodiment of the present invention.
Figure 4:
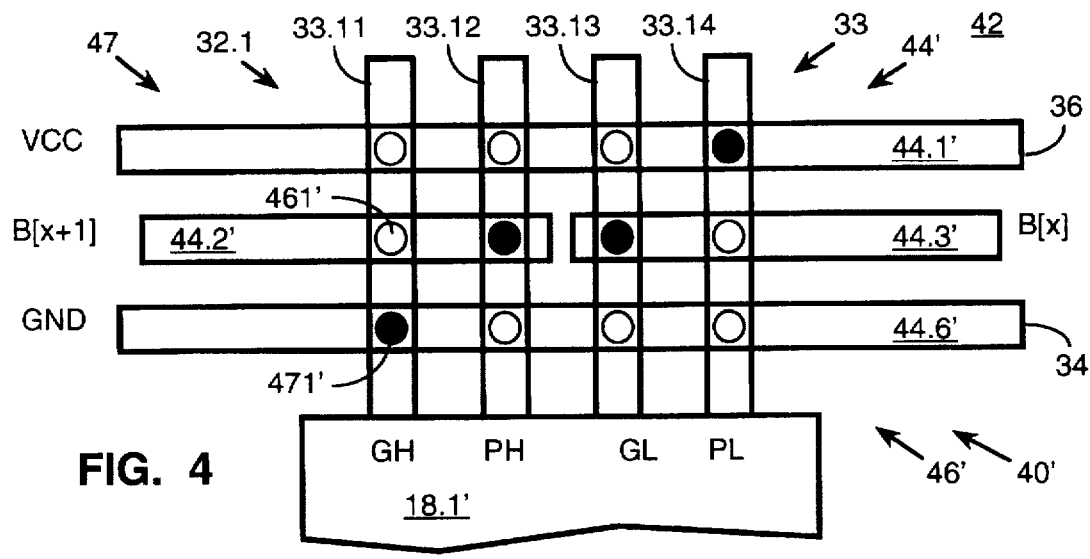
FIGS. 4-5 are views similar to FIG. 3 but according to a further embodiments of the present invention.
Figure 5:
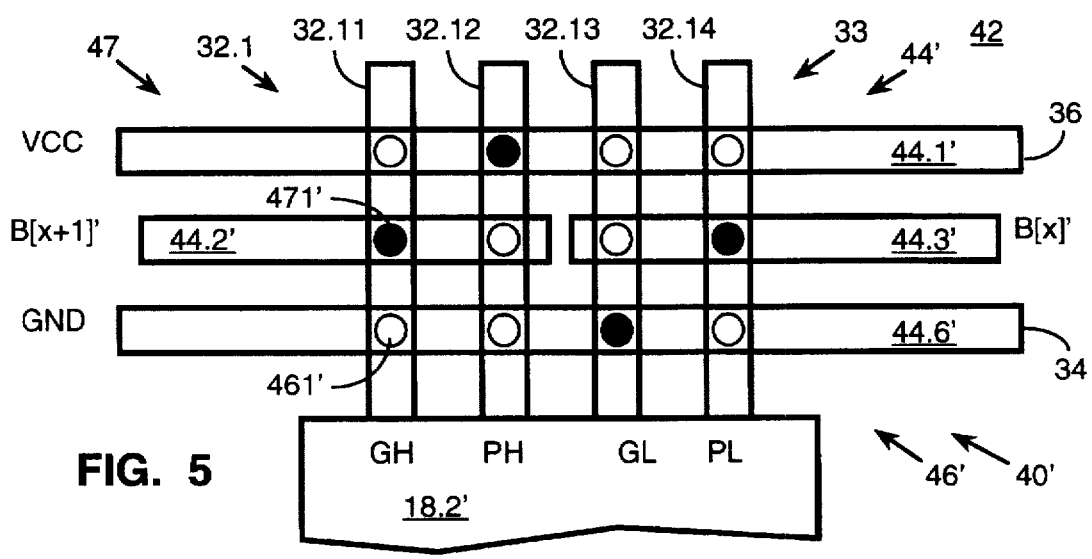

FIG. 3 is a simplified top view of portion 40 of integrated circuit 42 illustrating how a fixed reference value C[3:0] is wired into the circuit of FIG. 2 using programmable connection cells 32. FIGS. 4–5 are views similar to FIG. 3 but according to further embodiments of the present invention. FIGS. 3–4 correspond to programmable connection cell 32.1 electrically coupled between bus 12 and logic circuit 18.1'. FIG. 5 corresponds to cell 32.2 electrically coupled between bus 12 and logic circuit 18.2'.

Connection leads 33, comprising in the example of FIGS. 2–4, leads 33.11, 33.12, 33.13, 33.14, are coupled to inputs GH, PH, GL, PL of logic circuit 18.1. Passing underneath or above connection leads 33 and generally insulated therefrom are power, bus and ground connection leads 44, comprising logic level "1", e.g., VCC, on lead 44.1, B[3] on lead 44.2, B[2] on lead 44.3, B[1] on lead 44.4, B[0] on lead 44.5 and logic level "0", e.g., GND, on lead 44.6. In a typical integrated circuit or module layout, leads 33 and 44 generally have the form of narrow metallic or semiconductor stripes separated by an insulating layer except at certain predetermined locations 46 where interconnections can be made.

The circles shown at the intersections of leads 33, 44 indicate possible locations 46 where conductive interconnections 47 can be made or removed between any of leads 33 and any of leads 44. Open circles show no-connection points 461 and filled circles show connection points 471 needed to couple the appropriate bus lines (e.g., B[3] and B[2]) and to provide fixed reference value C'=YYyy to circuit 18.1, where YY indicate binary values (e.g., either 0 or 1) related to C[3] and C[2] and yy indicate values that are not needed within connection cell 18.1. Corresponding connection cell 32.2 (shown in FIG. 5) couples bus lines B[1] and B[0] and provides C'=yyYY corresponding to values C[1] and C[0], to logic circuit 18.2. FIGS. 3–5 illustrate a physical layout of the electrical leads and interconnections 471 are indicated by dashed lines 37 and circles 45 within connection cells 32 of FIG. 2. It will be noted that for C=1001, the connections C'=YYyy and C'=yyYY made in connection cells 32 correspond to C, where C=0110. This compensates for the elimination of logic layer 16, which otherwise inverts C.

Persons of skill in the art will understand based on the description herein how to provide any desired combination of interconnections representing a particular programmable reference value C[M:0] and dynamic bus values B[N:0]. Naturally, certain restrictions well known in the art apply to the permissible interconnections between leads 33 and 44, as for example, to avoid a power supply short circuit, a connection to both VCC and GND cannot be made from the same lead, and so forth.

FIGS. 4–5 illustrate a more compact and preferred arrangement for connection cells 32. FIG. 4 provides the same connections as in FIG. 3, but in less physical space. Like reference numbers are used in FIGS. 3–5 to refer to like elements and primed reference number (e.g., 40') are used to refer to elements in FIGS. 4–5 electrically equivalent to their counterparts in FIG. 3.

In FIG. 4, those bus lines not required for connection to a particular logic circuit, in this case to logic circuit 18.1, are omitted. For example, leads 44' are equivalent to leads 44 and lead 44.1' provides VCC (logic level 1), lead 44.2' couples to bus lead B[x+1] (e.g., B[3]), lead 44.3 couples to bus lead B[x] (e.g., B[2]), and lead 44.6' provides GND (logic level 0). For connection cell 32.1, x=2. Electrically, the results of FIGS. 3 and 4 are the same.

FIG. 5 is equivalent to FIG. 4 but illustrates a preferred embodiment of connection cell 32.2 coupling bus 12 to logic circuit 18.2 and providing the rest of the bits corresponding to reference value C. Connection locations 471' correspond to the connections illustrated schematically by circles 45 and dashed lines 37 in cell 32.2 of FIG. 2.

Techniques for establishing connections 471, 471' between leads 33, 44 of FIGS. 3–5 are well known in the art. Where leads 33, 44 are part of an integrated circuit, then interconnections 471, 471' can be formed by providing vias through the insulating layer overlying the lower level of conductors (either 33, or 44) so that when the upper layer of conductors (either 44 or 33) are applied, conductive material extends through the vias at locations 471, 471' to make contact to the underlying conductors, but not in locations 461, 461'. Photomasking techniques for accomplishing this are well known in the semiconductor art. Alternatively, connections can be initially formed at all crossover locations 47, and those not needed (e.g., at 461, 461') removed by etching or other means either before or after initial lead fabrication.

Programming of interconnections 47 in cells 32 can be done during initial circuit fabrication, as for example, by photomasking and etching as described above. Interconnections 471 can also be formed subsequent to initial circuit fabrication by using "field programmable" devices. Electrical elements whose conductivity can be altered after initial fabrication are well known in the semiconductor art and can be employed here to provide field programmable connections within cells 32. Either "program open" or "program closed" types of cells can be used for interconnections 47. For "program open", interconnections initially exist at all possible sites 47 and those not needed at locations 461 are removed by any number of well known techniques. Analogously, for "program closed", no interconnections are initially present at locations 47. Conductivity is established between leads 33, 44 only at locations 471. This can be done using any of a number of well known techniques. Electrically or optically alterable conductors or transistors are suitable interconnection devices for use in field programmable connection cells.

Figure 6:
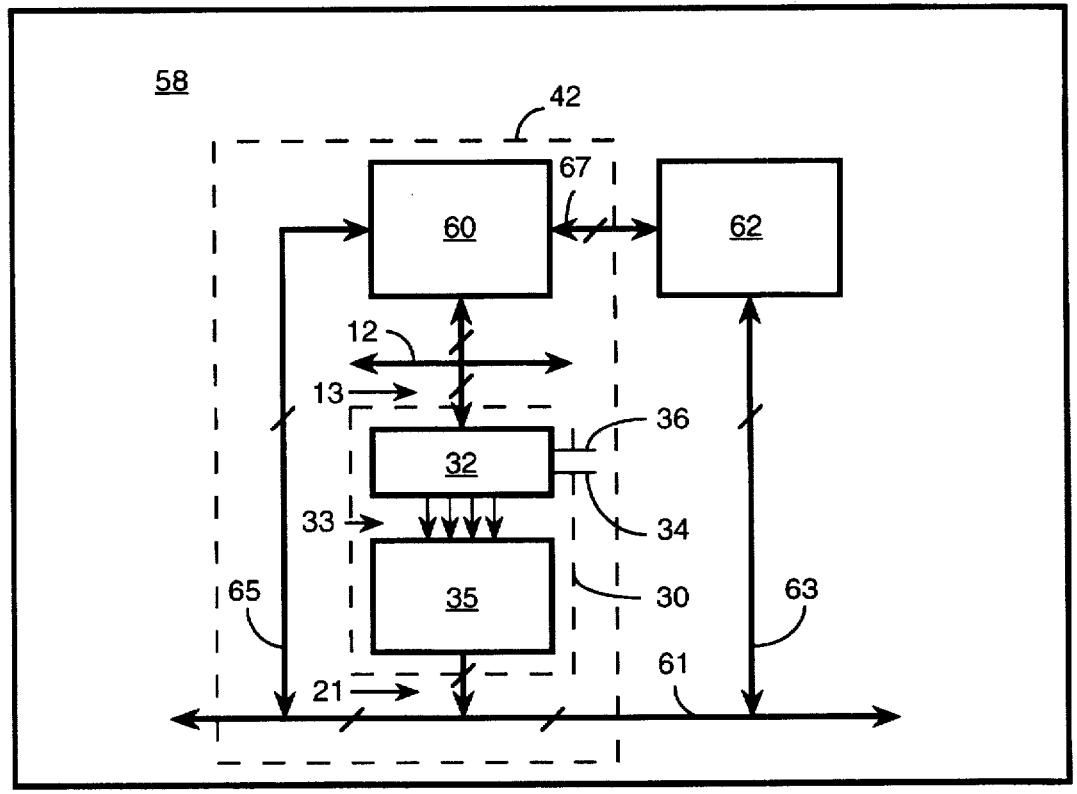
FIG. 6 is a simplified schematic block diagram of a system incorporating the comparator of FIG. 2.

FIG. 6 is a simplified schematic block diagram of system 58 incorporating comparator 30 of FIG. 2. System 58 includes integrated circuit or module 42 having controller 60 providing dynamic values B[N:0] on bus 12 which are coupled by leads 13 to connection cell 32 which also receive the appropriate logic HIGH and logic LOW signals on leads 36, 34, determinable from reference value C[M:0]. (It is assumed for convenience of explanation that logic HIGH correspond to VCC on lead 36 and logic LOW corresponds to GND on lead 34, but this is not essential.) Connection cell 32 is coupled by leads 33 to decoder 35 which carriers out the logical analysis previously described to provide on output leads 21, the desired comparison indication. Output leads 21 are conveniently coupled to bus 61 which is coupled to controller 60 via bus 65 and to peripheral 62 by bus 63. Peripheral 62 can be coupled to controller 60 by further bus 67 but that is optional. FIG. 6 illustrates any system which requires comparison of dynamic values B[N:0] to a predetermined constant reference value C[M:0] to accomplish a result to be carried out by controller 60 or peripheral 62 or any other internal or external sub-system (not shown).

By eliminating an entire layer or level of logic in the comparator (e.g., level 16), the present invention significantly speeds up the comparison process and reduces the required number of actives devices and circuit area. This is of great practical utility in high speed processor systems, as for example, those that are of interest for modern computer and telecommunication systems.

The device count and area saving can be substantial. For example, for a 4-bit word, 62 transistors are generally needed to implement the circuit of FIG. 1 while only 30 transistors are needed to implement the circuit of FIG. 2, which is a saving of 52% in transistor count. For an 8-bit word, the respective numbers of transistors are 134 and 70, saving 48% and for a 16-bit word the respective numbers of transistors are 278 and 150 for a 46% saving. Thus, there is a very significant saving in the number of devices needed to perform the comparison function.

Taking into account the area needed for connection cells 32 (which is much less than that needed for the transistors in the eliminated logic level), the net area saving for the comparator is about 30–35% depending on the word length. Such area saving is of great practical utility because it reduces the occupied semiconductor area and reduces the cost of the integrated circuit in which the comparator is implemented.

While the present invention has, for convenience of explanation, been described in terms of particular decoder examples and a particular digital word length, those of skill in the art will understand that it applies to other means and methods of implementing decoders using reference values that can be fixed during initial fabrication or post-fabrication programming. Accordingly, it is intended to include such variations and alternative as fall within the scope of the claims that follow.

What is claimed is:

1. An apparatus for comparing a dynamic value against a fixed reference value, the dynamic and reference values being in digital form, comprising:

a source of the dynamic value;

a decoder for comparing the dynamic value and a further value related to the reference value to produce a result indicative of the relative magnitude of the dynamic value and the reference value; and at least one connection cell between the source and the decoder, said connection cell comprising programmable connections between leads coupled to the decoder and leads coupled to the source and leads coupled to logic HIGH or logic LOW for making up the further value, the further value and reference value having a predetermined relationship.

2. The apparatus of claim 1 wherein the programmable connections are field programmable.

3. The apparatus of claim 1 wherein the programmable connections are made during initial manufacture of the connection cell.

4. The apparatus of claim 1 wherein the further value is the logical inverse of the reference value.

5. The apparatus of claim 1 wherein the at least one connection cell comprises a first array of conductors running in a first direction and a second array of conductors running in a second direction, said first array and second array of conductors being generally separated by an insulating layer except at desired interconnection locations.

6. The apparatus of claim 1 wherein the programmable connections are made by removing electrical conducting paths from locations within the connection cell.

7. The apparatus of claim 1 wherein the programmable connections are made by adding electrical conducting paths at locations within the connection cell.

8. An electrical system comprising a bus wherein dynamic values on the bus are compared to a fixed reference value, the system comprising, first leads coupled to a comparison means, second leads coupled to the bus and third leads coupled to sources of potential related to logical HIGH and LOW of the fixed reference value, said first leads, second leads and third leads being coupled by programmable connections so that the dynamic values on the bus and the sources of potential are presented to the comparison means so that information is obtained on relative magnitudes of the dynamic values on the bus and the fixed reference value.

9. The system of claim 8 wherein the programmable connections are made by electrically coupling some of the leads.

10. The system of claim 8 wherein the programmable connections are made by electrically decoupling some of the leads.

11. The system of claim 8 wherein the programmable connections are field programmable.

12. The system of claim 8 wherein the programmable connections are made during initial manufacture of the leads.

13. The system of claim 8 wherein the system comprises an integrated circuit and the programmable connections are between crossing, insulated, electrical leads of the integrated circuit.

14. The system of claim 13 wherein the programmable connections are provided during formation of the leads.

* * * * *